April 9, 1940.                J. H. HEIMAN                2,196,555
                      PULL-OUT HOOK ATTACHMENT UNIT
                          Filed March 20, 1939
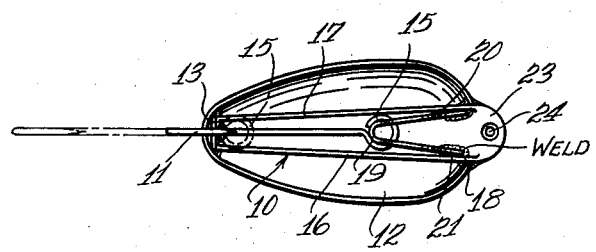
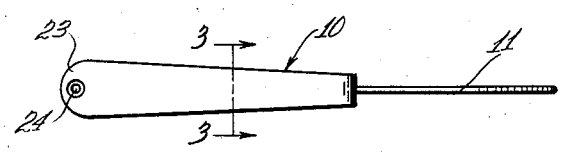   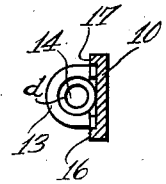
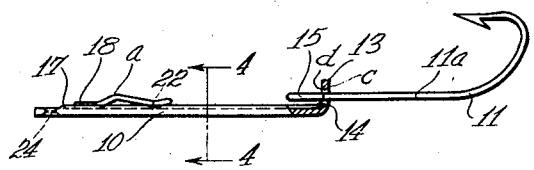   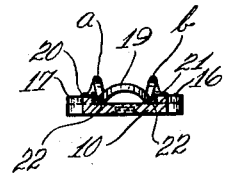
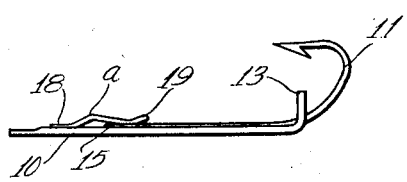
Inventor
Jesse H. Heiman
Herbert M. Birch
Attorney Patented Apr. 9, 1940

2,196,555

UNITED STATES PATENT OFFICE 2,196,555

PULL-OUT HOOK ATTACHMENT UNIT

Jesse H. Heiman, Hobart, Okla.

Application March 20, 1939, Serial No. 262,969

7 Claims. (Cl. 43—42)

My invention relates to fish lures and more particularly to a unit combining a fish hook and an attachment device adapted for fish lures such as minnow, spinner, plug, spoon or any suitable casting or trolling lure.

In the prior art all pull-hooks of this type and construction are combined as a necessary dependent part of a trolling spoon and are not constructed as a separate unit to be sold and used as an individual pull-out hook attachment unit for all types of fish lures.

Also, all sorts of lures which have dangling or trailing hooks attached to them are decidedly inefficient as the fish are often lost due to the fact that they strike directly at the lure body and not at the dangling or trailing hooks.

I overcome these and other disadvantages by providing a separate hook carrying unit that may be attached directly to the body of the lure at which the fish strikes.

Another object of my invention is produce an article of merchandise that may be economically manufactured and sold cheaply as a pull-out hook attachment unit for all species of fish lures.

And yet another object is to so construct and combine the elements comprising my pull-out hook attachment unit that the following advantages over the prior art result:

1. The construction consists of a narrow bar, along which the hook slides, adaptable for attachment to all types of lures.

2. The narrow bar is of distinctly novel construction for maximum efficient cooperation with the fish hook carried thereby.

3. The narrow bar is tapered with the wider and heaviest portion thereof away from the hook engaging end to give added weight at the top of the lure to permit use of a deeper bellied spoon, (when spoon type lure is used), to more closely resemble a small fish and to properly balance a deep-bellied spoon so that it will wabble when pulled through the water more prominently than a shallow spoon.

4. The narrow hook bar is grooved to guide the hook and hold the same from side twisting.

5. The upturned end of the narrow bar serves as an abrupt stop and swivel for the fish hook eye thereby serving to more securely hook and retain the hook in the fish.

The above and other objects and advantages of my invention will be more apparent from the following description in which;

Fig. 1 is a top plan view of my pull-hook attachment unit affixed to a trolling spoon.

Fig. 2 is a bottom plan view of the unit detached.

Fig. 3 is an enlarged cross section view of my invention taken on the line 3—3 of Fig. 2, looking toward the hook end as indicated by arrows.

Fig. 4 is a side elevation of the pull-out hook attachment unit per se with the hook extended.

Fig. 5 is an enlarged cross section view of Fig. 4 cut along line 4—4 as it appears when looking toward the enlarged clip end of the unit.

Fig. 6 is a side elevation of the pull-out hook attachment unit per se as it appears when set for a strike, with the hook eye secured under the clip.

Referring more specifically to the drawing, numeral 10 denotes a tapering narrow bar adapted to coactively tether and hold a hook 11.

The bar 10 has a flat surface on its underside for attachment to a fish lure by any suitable means or as illustrated in Figure 1 by soldering to a trolling spoon 12, indicated by the legend on the drawing.

The bar 10 on the upperside adjacent the shank of the fish hook is of distinct and novel construction. The small end of the tapered bar 10 is turned upward at substantially right angles to the remaining portion thereof to form a flanged end 13 having an opening 14 therein. The opening 14 is of sufficient size to receive the shaft 11a of the fish hook 11 and to permit free movement of the hook shank or shaft 11a longitudinally through the opening, but smaller than the hook eye 15. The opening 14 in flange 13 is also countersunk on both sides (c) and (d) to provide for easier swiveling action of the hook eye 15 in the flange and to permit the hook to be pulled more freely to either side at about 45° when in its extended position, thereby reducing the danger of a fish tearing loose against the weight and rigidness of the lure.

Extending from the small flange end 13 along the marginal edges of the tapered bar 10 are upstanding ribs 16 and 17. The ribs 16 and 17 serve as guides for the hook eye 15 when the hook is slid upwardly therebetween from extended position for temporary securement beneath spring clip 18. Also, upon engagement of the eye 15 beneath the clip 18 and between the ribs 16 and 17 the hook is securely lodged against side movement by the ribs and only a direct downward pull will release the hook.

The clip 18 is a substantially U-shaped device of spring metal or other suitable resilient material and is so shaped and so formed as to engage a portion thereof within the hook eye 15 to secure the hook from accidental displacement from beneath the clip, such as might result during use before the fish strikes.

The nose end 19 of the spring clip 18 is bent upward from its contact point 22 with the bar 10. Each leg 20 and 21 is then bowed upward at (a) and (b) from the bar 10 whereby a rounded penetrating cam-like surface 22 is formed at the base of the nose end 19 with the said upward bowed portions (a) and (b), which likewise provide additional spring leverage.

Extending from the bowed sections (a) and (b) the legs 20 and 21 are straightened to lie flat against the bar 10 for securement thereto by welding or other suitable means.

Above the clip 18 the bar 10 terminates into a relatively large head 23 with an opening 24 therein to receive a fish line. The opening 24 is countersunk on both sides of bar 10 and its edges rounded to prevent shearing through of the line when under strain.

In actual use the device as disclosed in Figs. 4 and 6 of the drawing, is intended to be sold and purchased as separate pull-out hook units for attachment to any type of fish lure.

By way of illustration I have shown it secured to a trolling spoon, see Figure 1.

In operation the device is secured to a fish lure in any suitable manner and the fish hook 11 has its barbed end inserted through the opening 14 in flanged end 13 with the hook shank 11a extending longitudinally between ribs 16 and 17 and the hook eye 15 snugly socketed under the clip 18 between said ribs, said hook being separable from the bar 10.

The hook when secured under the clip 18 is set for action and when the fish strikes a downward pull is exerted upon the hook 11 and the eye 15 is released from beneath the clip and its rounded cam-like projections 22.

The hook slides downwardly and is stopped abruptly by the eye 15 striking the flange 13, whereupon a sudden upward push of the hook more deeply penetrates the barb into the fish.

The countersunk opening 14 and the rounded hook eye 15 now serve as a swivel joint equivalent in efficiency to a ball and socket swivel and because the opening 14 is countersunk on both sides the hook is permitted to swivel at an angle of substantially forty-five degrees.

The angular swiveling action of the hook with respect to the bar 10 has a decided advantage over the prior art as the fish is unable to use the weight and rigidness of the lure to dislocate the hook.

During the trolling operation the wabbling action of a deep bellied spoon is greatly improved for fish movement simulation because of the added weight of the relatively larger head portion 23 on the tapered bar 10.

Heretofore, it was necessary to use a shallow spoon to properly simulate fish movement during trolling and which shallow spoon failed to perform efficiently and tended to frighten away certain fish, because it in no way resembled a live bait; whereas a deep bellied spoon does resemble a small fish and with the added weight at the line end will simulate fish movement equally as well as is possible with a shallow spoon.

While I have shown but one means of attaching my unit to a fish lure, it is to be understood that any other suitable means of attaching my device is contemplated within the scope of the appended claims.

I claim:

1. As an article of manufacture, a pull-out hook attachment for fish lures comprising a fish hook having an elongated shank, an eye on the end of said shank, an elongated bar, hook holding means on said bar, and said bar having an upstanding flange end with an opening therein in alignment with the hook holding means, said opening being smaller than the hook eye and being traversed by the hook shank.

2. The device as described in claim 1, in which the flange end is countersunk on both sides of the opening therein.

3. In combination with a fish hook, a bar with an upturned end having an opening therein countersunk on both sides to receive a fish hook and having an enlarged flat end with an opening countersunk on both sides to receive a fish line.

4. In combination with a fish hook, an elongated tapering bar comprising a flanged end portion with a hook receiving opening therein, upstanding ribs along each marginal edge thereof, and hook holding means secured between the ribs.

5. In combination with a fish hook and deep-bellied trolling spoon, an elongated hook holding bar secured to the trolling spoon, said bar having a line receiving end and a hook receiving end said line receiving end being larger and relatively heavier than the smaller hook receiving end, whereby a deep-bellied spoon is adapted to wabble and simulate a small fish.

6. In combination with a fish lure, a pull-out hook device attachment therefor comprising a hook having an eye portion at an end of the hook shank and an elongated hook tether bar having an opening therein, said opening being smaller than the hook eye, said elongated hook tether bar including upstanding ribs along each marginal edge thereof and a hook eye engaging spring clip secured to the bar between said ribs.

7. The device described in claim 6, in which the hook eye engaging spring clip comprises a member having an upturned nose, a pair of upwardly bowed legs, and a pair of rounded projections adapted to penetrate the hook eye.

JESSE H. HEIMAN.